Figure 1:
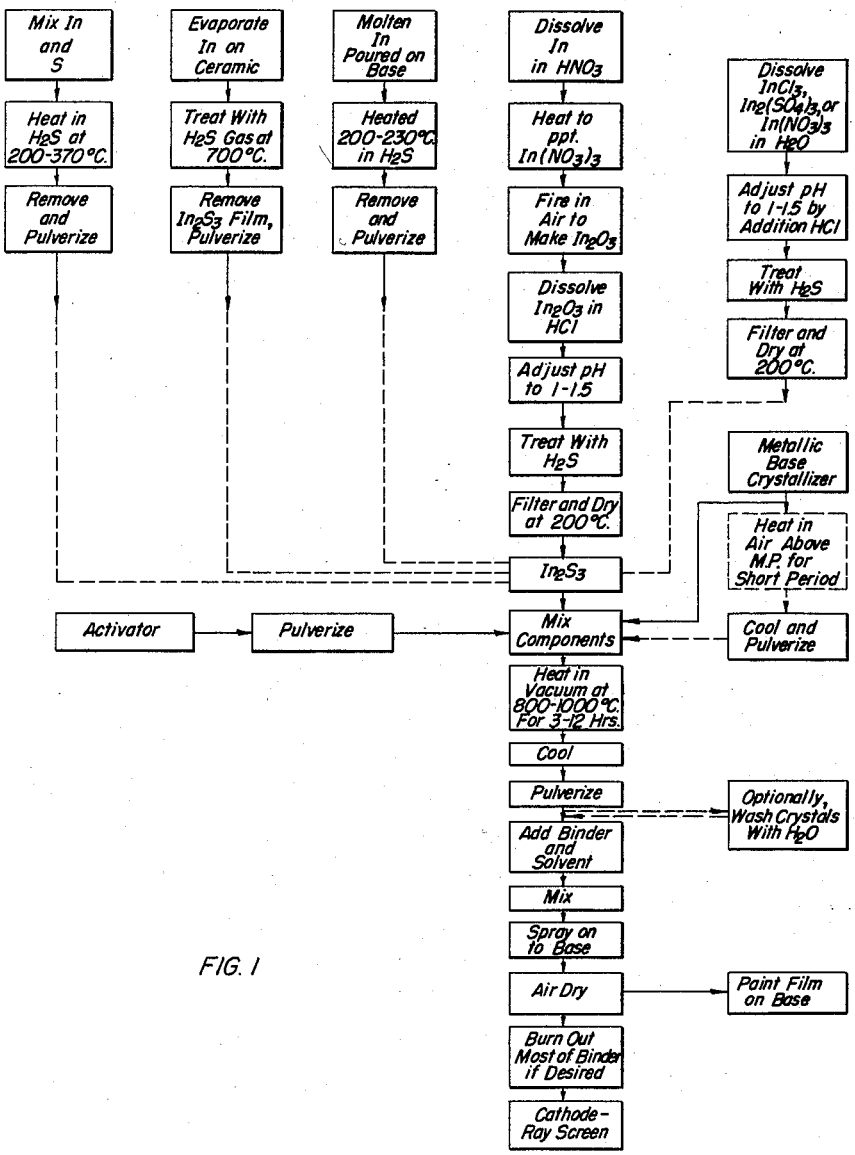

INVENTORS.
Arthur E. Middleton
Donald C. Reynolds
Charles S. Peet

AGENTS.

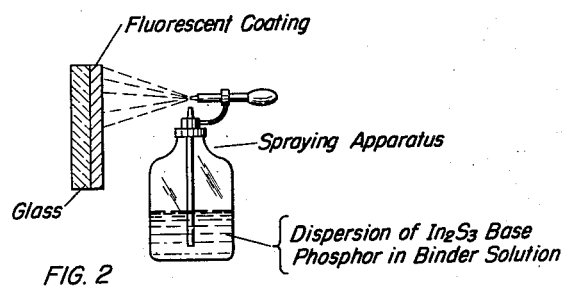
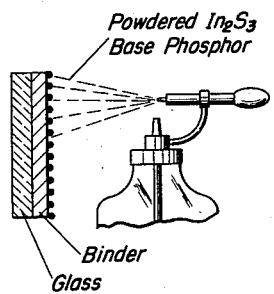
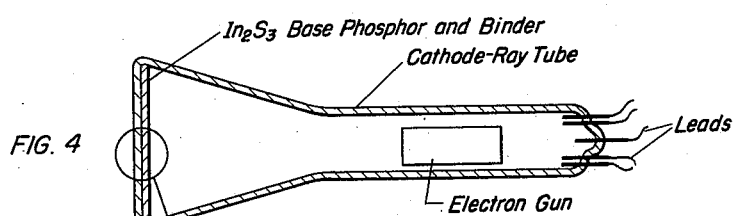
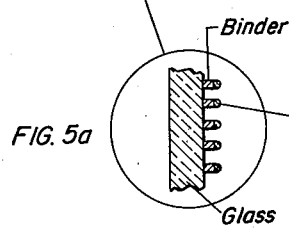
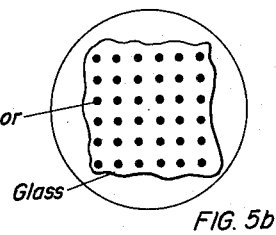
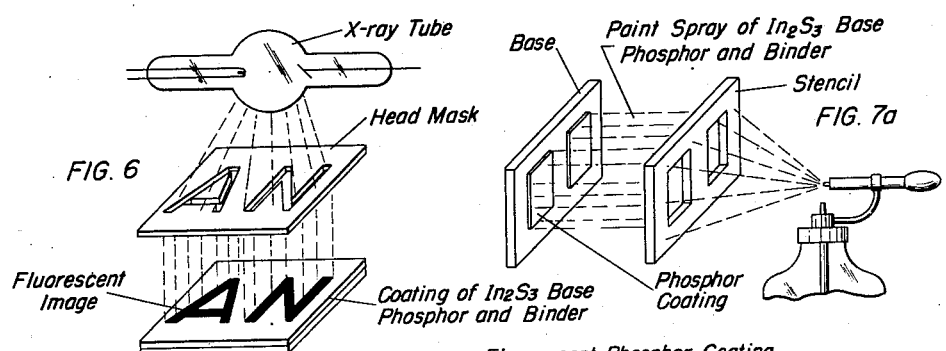
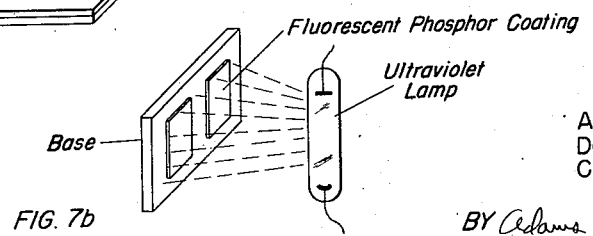
INVENTORS.
Arthur E. Middleton
Donald C. Reynolds
Charles S. Peet April 20, 1954

A. E. MIDDLETON ET AL 2,676,112

PHOSPHOR PRODUCT CONTAINING INDIUM
AND METHOD OF PRODUCING SAME

Filed Aug. 18, 1951

3 Sheets-Sheet 3

INVENTORS.
Arthur E. Middleton
Donald C. Reynolds
Charles S. Peet

BY Adams, Stevens and Mase
AGENTS.

Patented Apr. 20, 1954

2,676,112

UNITED STATES PATENT OFFICE 2,676,112

PHOSPHOR PRODUCT CONTAINING INDIUM
AND METHOD OF PRODUCING SAME

Arthur E. Middleton, Donald C. Reynolds, and Charles S. Peet, Columbus, Ohio, assignors, by mesne assignments, to The Consolidated Mining and Smelting Company of Canada, Limited, Trail, British Columbia, Canada, a corporation of British Columbia, Canada Application August 18, 1951, Serial No. 242,564

17 Claims. (Cl. 117—33.5)

This invention relates to new and novel phosphors and, more particularly, to phosphors of indium. Specifically, this invention relates to indium compounds which are made into phosphors or rendered fluorescent, to compositions containing such phosphors and characterized by their ability to be readily applied to base materials, to methods or processes of making such phosphors and compositions, to articles containing such phosphors and compositions, and to methods of making these articles.

Phosphors have found many uses in industry in recent years and notable among these are where phosphors have been used in cathode ray tubes, such as radarscopes and television tubes. Phosphors have also been employed to make fluorescent paints for use in screens and signs. Scintillation counters provide other media for the use of phosphors. With the advent of television, the demand for phosphors, which will respond to electron bombardment, as well as other radiation, and emit colored light or be fluorescent in certain color ranges of the spectrum, has greatly increased, and, therefore, it is an important object of the present invention to afford a new and novel phosphor, which will respond to the usual exciting means, including electron bombardment, and will be fluorescent in certain color ranges of the spectrum, thereby increasing the availability and use of phosphors particularly in color television. Although many compositions, including indium itself and its compounds, are not fluorescent, a way has now been found to make indium phosphors, or an indium-base compound, which fluoresces and emits certain colors, and it, therefore, is another object of this invention to provide a new and novel indium-base phosphor compound which will respond to radiation and be fluorescent in certain color ranges of the spectrum.

It is yet another object of this invention to provide a method of making such an indium phosphor compound.

It is still another object of this invention to provide a new and novel indium phosphor composition suitable for dipping, dusting, roller-coating, and spraying, on a basis material to make a coating or screen which will fluoresce when radiated.

It is a further object of this invention to provide a method of applying said phosphor, and/or phosphor composition, to a base material.

It is a still further object of this invention to provide an article having a coating thereon of an indium phosphor, and/or composition containing an indium phosphor compound.

It is again an object of this invention to provide a method of producing indium compound base phosphors and/or phosphor coating compositions which are fluorescent in various ranges of the spectrum, and It is yet again an object of this invention to provide a method of making an article having such fluorescent means.

Figure 8:
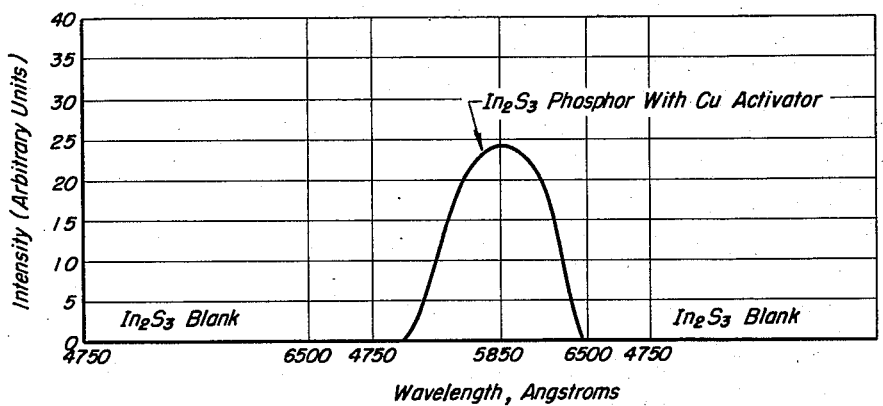
Figure 9:
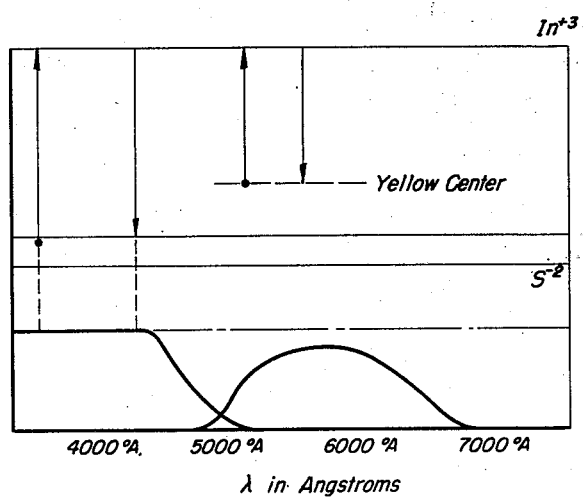

These and other objects and advantages of the present invention will become more apparent to those skilled in the art from the following detailed description, examples and drawing, wherein:

Fig. 1 is a flow sheet of the method of preparing the new and novel indium phosphor and phosphor composition of this invention and applying it to a base material, and Fig. 2 illustrates a method of coating a base material with the phosphor composition disclosed herein, and Fig. 3 illustrates a method of applying the phosphor compound of this invention directly to a base material containing an adhesive layer, and Fig. 4 discloses a cathode ray tube containing the indium phosphor of this invention, and Fig. 5a and b is an enlarged vertical sectional and front elevational view of a portion of the device shown in Fig. 4, and Fig. 6 shows a method of utilizing the new and novel phosphor disclosed herein to produce images, and Fig. 7a and b shows a method of spray-painting with the phosphor and exciting the resulting coating, and Fig. 8 is an absorption spectra diagram of the phosphor of this invention, and Fig. 9 is an energy level diagram of the phosphor of this invention.

It has now been found that an indium sulfide base phosphor can be made by crystallizing it from a melt in a vacuum under appropriate conditions of time and temperature by use of a metallic base crystallizing agent and in the presence of a metal-base activator. When excited by X-ray, ultraviolet ray and other radiation, the indium-sulfide base phosphor of the present invention emits a variety of colors according to the kind of crystallizing and activating substances used. Moreover, the phosphor of this invention can be readily incorporated in a binder and sprayed on a base to form various novel fluorescent coatings.

It is not precisely known why a major amount of indium sulfide containing a minor amount of a metallic halide and of a metal activator becomes fluorescent under radiation since none of the materials, per se, that is indium sulfide, the metallic base crystallizer, and the metal-base activator from which the indium-sulfide phosphor compound is made, are themselves considered to be fluorescent. As a matter of fact, $In_2S_3$ as obtained by known methods is not considered as a possible fluorescent material for it does not have the proper crystal size and structure. If any crystals are present, they are either so few in number and so finely divided, or are in such an unactivated state, that the compound will not fluoresce. However, it is believed that by the process disclosed herein the indium sulfide is crystallized in a spinel type of structure by the crystallizer which also may combine with or enter into the indium sulfide lattice or molecule, since some fluorescence is obtained therewith. However, practically all of the fluorescence is due to the metal-base activator which enters or fuses within the crystal lattice or matrix of the indium sulfide to provide primary fluorescent centers which can be energized readily by a source of energy. In the present case the crystallizer may also be considered in the sense of a flux while the metal-base activator might be thought of as a foreign impurity atom or molecule providing impurity centers in the indium sulfide molecule to result in fluorescence under radiation.

It is not necessary to add a large amount of the crystallizer to the indium sulfide; only a sufficient amount need be added or be present in or with the indium sulfide to provide the necessary crystallizing or fluxing action or the proper crystal lattice conducive to reception of activators during heating and cooling.

In the case of the activator, only a very minor amount is needed to provide the desired fluorescence, color and intensity. It is not precisely known how the activator operates, although it is believed that, as discussed above, it enters the crystal lattice of the indium sulfide and causes emission alone or in combination with the crystallizer.

In general, as is readily seen from the flow sheet, Fig. 1, indium sulfide can be prepared in a number of ways and added to the crystallizing agent and activator. The mixture is then heated in a vacuum for a period of time and at a temperature sufficient to cause the flux to form the necessary crystal lattice and for the activator to enter therein to provide fluorescent or impurity centers resulting in, on cooling, a phosphor or a complex salt of indium sulfide, crystallizer and activator. The resulting fired, solid or fused, phosphor, after being powdered or reduced to a fine state, can be used directly as a fluorescent material by sprinkling it on a base plate and subjecting the powder layer to radiation. However, it is much more advantageous and practical to disperse it in a sufficient amount of an adhesive binder and spray it onto the base as disclosed in Fig. 2. The powdered phosphor can also be sprayed as a dry material on to a backing coated with an adhesive or binder, as disclosed in Fig. 3. Fig. 4 shows the new and novel composition of this invention applied to the inner face of a cathode ray or television tube. Fig. 5a and b is an enlarged portion of the television tube screen showing the phosphor existing on the inner face of the tube as a plurality of tiny particles held thereon by a minor portion of the adhesive, the bulk or remainder of the adhesive having been burned off to decrease the opacity of the tube and to leave essentially only the fluorescent particles thereon. In Fig. 6 there is shown a base having a coating of the present phosphor which is caused to exhibit a fluorescent pattern when excited by radiation from an X-ray source through a mask or stencil which absorbs part of such rays. Fig. 7a and b illustrates the use of the indium phosphor of this invention to form a painted design which will fluoresce under excitation from an ultraviolet light. The diagram of Fig. 8 gives the spectral distribution of an indium-sulfide phosphor of this invention containing copper as an activator. The phosphor was excited with the 3650 Å. line of mercury. The spectral distribution was measured with a spectrophotometer and the fluorescent intensity was measured with a photomultiplier tube. The emission band of this phosphor was approximately 1500 Å. wide with a peak at about 5850 Å. which approaches the red portion of the spectrum. This phosphor was compared with an $In_2S_3$ (untreated) blank. Fig. 9 is an energy level diagram or picture of a phosphor of this invention, having yellow fluorescent centers and showing the possible electronic transitions in the material.

The indium-sulfide activated base or matrix material forms the major or predominating amount of the bulk of the phosphor material, the balance being minor amounts of the crystallizing agent and of the activator, and can be prepared by a number of methods. One method comprises vacuum evaporating indium onto ceramic bases, such as porcelain squares, which are subsequently exposed to $H_2S$ gas for one hour while being heated at 700° C. in an enclosed furnace to provide an indium-sulfide film. The film can then be removed from the ceramic base, pulverized, and mixed with the other constituents. Another method is to first pour molten indium on the base which is then heated to from 200 to 230° C. for three hours in an $H_2S$ atmosphere. Still another method comprises combining indium and sulfur directly by first pulverizing and mixing the materials together and then firing in an $H_2S$ atmosphere at red heat wherein the elements combine with incandescence followed by a second pulverizing, mixing, and firing in $H_2S$ at from 200 to 370° C. for from two to three hours. The second series of operations is repeated, if desired, to obtain a fully complete conversion of the indium and sulfur into indium sulfide. The best method is to prepare $In_2S_3$ by chemical methods which reduce the impurity content. This is achieved by first dissolving indium in nitric acid and boiling the solution until $In(NO_3)_3$ crystallizes out. The nitrate is then fired in air to form $In_2O_3$ which is next dissolved in HCl to insure that the indium ions are in a valance state of plus three. The pH of the solution is adjusted to 1 to 1.5 and kept constant, while $In_2S_3$ is precipitated by passing $H_2S$ through the solution. The precipitate is washed thoroughly and then dried in a vacuum oven at 200° C. Before drying, the precipitate is usually yellow but is changed to the typical orange color of amorphous $In_2S_3$ by drying. The amorphous material contains about 3 per cent moisture, although this is not critical. Less pure $In_2S_3$ can be obtained by dissolving commercially made $InCl_3$, $In_2(SO_4)_3$, or $In(NO_3)_3$ in the proper amount of water, correcting the pH as discussed above, and then passing $H_2S$ gas through the solution followed by the usual filtering, etc., steps.

The crystallizing or fluxing agent is necessary in order to provide a melt in which the indium sulfide will dissolve and from which it is caused to or will crystallize in a manner such that its lattice will have the proper configuration and will accept an activator atom or an impurity will be entrapped there and, thus, it will become fluorescent under radiation. The crystallizer should melt, or boil, and not decompose below the melting (sublimation) point of indium sulfide and be capable of dissolving $In_2S_3$ and, on cooling from the melt, of inducing or forming a spinel type of crystalline $In_2S_3$. It has been found that a metallic halide crystallizing agent such as magnesium chloride, magnesium chloride and sodium bromide, magnesium chloride and sodium chloride, magnesium fluoride and sodium chloride, and magnesium fluoride and sodium bromide are eminently suitable for this purpose as they readily crystallize the indium sulfide with the necessary lattice. For the purposes of this invention magnesium chloride plus sodium bromide will be considered as one crystallizing agent. The same applies to magnesium chloride plus sodium chloride, etc. Magnesium fluoride likewise can be employed as a crystallizing agent, but only appears to perform satisfactorily when the resulting phosphor is subjected to electron bombardment. However, if it is utilized with sodium chloride, the resulting phosphor will be found useful under all types of radiation disclosed herein. Moreover, some increase in intensification of the phosphor is observed. Thus, magnesium fluoride is preferably utilized with sodium chloride which will be considered as one crystallizer. Moreover, potassium may be substituted for sodium in the above crystallizers with equivalent results. It is obvious that other crystallizers, which function like the above, can be utilized without departing from the scope of this invention. The anion of the halides is believed to play an important part in forming such impurity centers, although the cation must also be present. The crystallizer also probably enters the lattice since weak fluorescence has been observed when using certain crystallizers. The other halides of these metals cannot usually be used since they are deliquescent or, at elevated temperatures, they are apt to decompose, sublime, or react violently and, consequently, are not so practical. Moreover, such halides apparently are not absorbed in the crystal lattice of the indium sulfide, since their atomic radii are so large. Thus, the iodides are not too acceptable. The fluorides apparently are also not satisfactory except in special cases, as noted above, or when utilized with sodium chloride, which may modify it or be modified by it.

The amount of the crystallizing or fluxing material added to the indium sulfide, or which should be present in the crystal lattice thereof, need be only that amount required to provide the necessary crystallization and condition of the $In_2S_3$ so that it will absorb the activator in its lattice. Large amounts are not used, as such appreciably change the color or decrease the intensity of the resulting phosphor, and are detrimental in that no fluorescence at all will occur. Moreover, large amounts of crystallizing agent may increase the cost of the phosphor out of proportion to the results obtained. Hence, only a very minor amount need be present. For consistently satisfactory results from a practical standpoint, it is necessary to use a total of from 0.01 to 10 per cent by weight of the crystallizing agent in, or with, the indium sulfide, and, thus, this represents a preferred range, the balance being essentially the indium sulfide except for the activator. It, thus, is seen that, while the quantity of crystallizing agent used is not too critical when minor amounts are employed, it must always be present in an amount sufficient to provide a crystal lattice for the indium sulfide. Where a double crystallizing agent is used, the amounts of each component are not critical. For example, where magnesium chloride and sodium chloride are used, the amount of magnesium chloride can vary from 10 to 90% by weight, the balance being sodium chloride. Generally, about 50% by weight of each constituent is used.

It will be noted that some of the crystallized or fluxed indium sulfides are only weakly fluorescent and, thus, are impractical to use, and others do not exhibit any fluorescence. Thus, it is necessary to activate them, or to provide the primary fluorescence, or increase it to a practical extent. To achieve this purpose, a material deemed an activator is added to the indium-sulfide compound, usually at the time the sulfide is crystallized by the metallic halide. The activator, which is also defined to include those compounds which change the color of the emission, should be capable of entering the indium sulfide matrix, and is added to the phosphor composition in only very minor amounts. Large amounts are to be avoided. Only that amount of activator need be added to cause the indium sulfide to fluoresce and/or change the color and intensity of the light emitted. For best purposes it has been found that from 0.001 to 0.1 per cent by weight, as the metal, of the activating agent in the crystal lattice of, or added to, the indium sulfide will provide the necessary fluorescence and desired color and degree of intensification of the light emitted, and, hence, this represents the preferred range, the balance being the crystallizing agent and indium sulfide, as noted previously. An example of an activator particularly suitable for $In_2S_3$ is a metal selected from the group consisting of cadmium, copper, gold, lead, lithium, manganese, silver, tin, zinc, and the rare earth metals (lanthanum, cerium, praseodymium, neodymium, samarium, europium, gladolinium, terbium, dysprosium, holmium, erbium, thulium, neo-ytterbium, lutecium, celtium, scandium, and yttrium). Moreover, the halide, nitrate, nitride, oxide, sulfate and sulfide salts of these activating metals can likewise be employed with equivalent results. These metals and their salts can be used singly or in mixtures of one or more within the total amounts as described above. Where more than one activator is used, the amount of each, within the range disclosed, is not critical.

The phosphor of this invention can very readily be prepared. First, the crystallizing material desirably, although this is not essential, is heated in an inert or nonreactive crucible in air above its melting point, for example, from 20 to 30° C. above its M. P., for a short period of time, about 5 to 10 minutes, to drive off moisture, and then is allowed to cool and is subsequently pulverized. It is next mixed with the required amount of indium sulfide prepared by one of the methods described previously, and also with the activator, and heated in a vacuum to a high temperature for a relatively long period of time. The use of a vacuum rather than air or inert gases permits crystallization below a point at which $In_2S_3$ would decompose or sublime. The time and temperature used should be sufficient to cause the crystallizer to melt and the indium sulfide and activator to disperse therein so that on cooling the indium sulfide crystallizes in spinel form with the activator and some, if not all, of the crystallizer, fused in its lattice. It may be possible that the activator also melts with the crystallizer. It has been found best to heat to a temperature of from 800 to 1,000° C., for from 4 to 12 hours. After cooling, the solidified mass is pulverized to provide a useful particle size. A size not smaller than 325 mesh will be sufficient. Smaller sizes are to be avoided as fracturing of crystals and loss of fluorescence will then occur. Further, the pulverization should not be carried on too long, nor allowed to result in heating, to prevent changes in the phosphor, which would adversely affect its fluorescence.

The resulting pulverized phosphor can then be directly dusted or spread on a plate or other surface to make a coating or film which will respond to various types of radiation. It, however, is more practical to disperse it in an adhesive or other binder composition and spray it to form an adherent coating, as will be more fully discussed below.

Moreover, prior to use an increase in intenstiy of fluorescence may be observed if the phosphor is washed to remove any excess of crystallizer which is not absorbed in the $In_2S_3$ lattice or attached to the $In_2S_3$ molecule, although this step is not essential and might be avoided since some of the phosphor may be dissolved or mechanically lost during washing by entrapment.

The binder material should adhere strongly to the base plate on evaporation of the solvent as well as provide a dispersing medium for the phosphor particles which will be retained by it. The binder should also be inert with respect to the phosphor, and, when used in cathode ray tubes or other articles through which light should pass, should also be translucent or transparent. Moreover, the binder should not fluoresce so as to mask the effect of the phosphor. The binder should also readily decompose or burn off at relatively low temperatures, about 150° C. Furthermore, the binder should not decompose nor break down during mixing or after spraying so that its properties are changed. The particle size of the binder material is not too critical. It can be placed in the milling or mixing machinery in the size and form as commercially furnished, for it will be reduced to a very small particle size during mixing and grinding and further will dissolve in the solvent.

Satisfactory binder materials for the practice of this invention are polystyrene, silicone, acrylic acid esters, and Vinylite polymers or resins. An example of such binders is Vinylite VYHH which is a vinyl chloride-vinyl acetate copolymer. Its approximate chemical composition is 87 per cent vinyl chloride and 13 per cent vinyl acetate. It has an intrinsic viscosity measured in cyclohexanone at 20° C. of 0.53. Another resin is Vinylite VMCH which is a vinyl chloride-vinyl acetate copolymeric resin which is modified with 1 per cent of an interpolymerized dibasic acid (0.7 to 0.8 carboxyl). The composition of this resin is approximately 86 per cent vinyl chloride, 13 per cent vinyl acetate, and 1 per cent dibasic acid. It has an intrinsic viscosity (cyclo-hexanone at 20° C.) of 0.53. Still another resin is Acryloid A-10 which is a polymerized ester derivative of acrylic and alpha methyl acrylic acids. This product is supplied as a 30 per cent solids solution in Cellosolve acetate, and has a specific gravity of 1.03, a refractive index of 1.428, and a Gardner-Holdt viscosity of U-W. Acryloid B-72 is a polymerized ester derivative of acrylic and alpha methyl acrylic acids. It is supplied as a 40 per cent solution in toluol, and has a specific gravity of 0.97, a refractive index of 1.489, and a Gardner-Holdt viscosity of S-W. Another binder, Silicone DC 804, is a silicone resin supplied as a 60 per cent solids solution in aromatic naphthas and coal tar hydrocarbons (e. g. toluol, xylol, etc.). It is a straw-colored solution with a specific gravity of 1.06 and viscosity of 0.3 to 1.0 centipoise at 25° C. Polystyrene is a thermoplastic resin made by polymerizing styrene. Parlon (chlorinated rubber) can also be effectively employed as a binder. In general, this product contains from 66 to 68 per cent chlorine which corresponds approximately to the chemical formula $(C_{10}H_{13}Cl_7)_x$. However, the incorporation of a small amount of a plasticizing material with it, such as rezyl 869, will improve its adhesion and flexibility. Rezyl 869 is an alkyd resin containing approximately 60 per cent linseed oil and 40 per cent glycerol phthalate. This resin has an acid number of 2-6, contains a minimum of 27 per cent phthalic anhydride, and is supplied at 100 per cent solids. For the purposes of this invention, parlon containing rezyl will be considered as one binder.

Moreover, other suitable materials for forming binder compositions are Amberol resins (oil-soluble, solid phenol-formaldehyde and/or maleic-glyceride resins, and usually rosin modified, having a specific gravity of from 1.09 to 1.11 and a melting point of from 121 to 160° C.), staybelite esters (mono-, di- and tri-ethylene glycol and glyceryl esters of hydrogenated rosin), polyethylene resins, Pliofilm (rubber chloride), polyvinyl chloride resins, polyvinyl acetate resins, and alkyd resins (reaction product of mono-, di- and tri-basic acids with polyhydric alcohols and containing a drying or nondrying fatty acid oil as an internal plasticizer). These and the foregoing resin materials can be used singly or mixed together.

It is obvious that still other materials, which form adherent layers, on base or basis materials as well as with the phosphor, do not plasticize in the presence of the phosphor nor adversely affect it, and readily burn, decompose, or are subject to dissolution at low temperatures, can be employed in the composition.

The solvent used with the binder should be a substantially pure, low-boiling point hydrocarbon solvent, and, like the binder, should not introduce impurities into the phosphor. The solvent also should preferably be one that is suitable for the particular binder employed, and it should not react with the binder material to form a polymerized product or similar substances which cannot be sprayed. Furthermore, the solvent should not affect the adhesiveness of the binder. Part of the solvent may be added to the phosphor and binder in the mill to provide good grinding viscosity and the balance added after milling to increase the fluidity of the resulting mixture. The total amount of the solvent used is from ½ to 5 parts by volume of the solvent to 1 part by volume of the binder, which has resulted in readily sprayable organic binder solvent compositions or solutions. It is preferred, however, to use from 0.8 to 1.4 parts by volume of solvent to 1 part by volume of binder in the organic binder composition. It is obvious to those skilled in the art that, where less solvent is present, it may be necessary to warm the composition slightly or increase the pressure in order to spray it. However, the temperature of the composition should not exceed 50° C. in order to prevent excessive evaporation of solvent before spraying and formation of a rippled surface on the base when sprayed.

Examples of suitable solvents for use with the binders disclosed herein, are pentane, toluene, Cellosolve acetate, xylene, gasoline, petroleum naphtha, Amsco F, benzene, trichloroethylene, methyl isobutyl ketone or mixtures thereof. Cellosolve acetate is an organic chemical whose formula is $C_2H_5OCH_2CH_2OOCCH_3$. Amsco F is an aromatic petroleum solvent with the following approximate characteristics: specific gravity (60° F.) 0.8628, 77 per cent aromatics, refractive index of 1.4905, mixed aniline point of 86° F., flash point 130° F., and Kouri Boutanol value of 70.

The amount of the indium-sulfide base phosphor used in the sprayed composition is generally related to the quality of the resulting picture or amount of fluorescence desired. A large excess of binder material with respect to the phosphor will naturally result in less phosphor particles per unit area of the coating and, therefore, a grainy picture or a light having less intensity will result. In some cases an excess of binder will result in no fluorescence. On the other hand, there should always be sufficient binder present to effectively hold the dispersed phosphor particles in the coating and/or to the base layer or material. Compositions containing one part by volume of the indium-sulfide phosphor to 0.1 to 15 parts by volume of binder have produced good phosphor coatings or paint films on bases. To obtain the best fluorescence under all conditions, it has been found most desirable to prepare a composition containing one part by volume of indium-sulfide base phosphor to 0.2 to 0.5 part by volume of binder. Hence, in such cases the following ratios, including the solvent, will provide satisfactory sprayable compositions:

1. Acceptable phosphor binder-solvent compositions or solutions: one volume phosphor+from 0.1 to 15 volumes binder+0.05 to 75 volumes solvent (or from ½ to 5 volumes solvent for each volume of binder).

2. Best or preferred phosphor binder-solvent compositions or solutions: one volume phosphor+from 0.2 to 0.5 volume binder+0.16 to 0.7 volume solvent (or from 0.8 to 1.4 volumes solvent for each volume of binder).

It is unnecessary to add the phosphor to the binder in the mill or mixing machinery in the form of finely divided particles, but the phosphor can be added in the form of chunks, grains or pellets. The phosphor, binder and solvent should be thoroughly dispersed throughout the binder, or binder and solvent, and no surface irregularities, masses of unmixed particles, etc., appear in the final coating on low magnification. It is preferred to mix and grind, or mill, until the particles in the composition have a size not smaller than about 325 mesh, although compositions having particles up to about .0002 inch in size have proven satisfactory. Instead of adding the phosphor in pellet or pulverized form to the mill, followed by the separate additions of binder and solvent, it, of course, is obvious that a solution of the binder in the solvent can be added to the phosphor in the mill. It is only necessary that enough solvent be present during milling to give good grinding viscosity. The phosphor can also be pulverized first and milling replaced by simple mixing.

Any commercially available mixing and grinding machinery can be utilized for this procedure, although it is desirable to use a ball mill at room temperature. The mill usually is not heated nor cooled although the temperature during milling should not be allowed to rise appreciably to prevent changes in the nature of the phosphor crystal lattice. Ceramic, glass or steel balls can be used in this mill. Steel balls, however, have been found best as they produce a better mixing and grinding action. The time of mixing is not critical, although it has been found preferable to mix until the particles have been reduced to not smaller than about 325 mesh in size. The equipment should also be thoroughly cleaned before mixing to prevent the introduction of any impurities which might adversely affect the resulting phosphor composition.

At the end of the milling period, additional solvent can then be added to the mixture and the mill operated for a short time. This insures sufficient fluidity so that the composition can be readily sprayed and provides a complete dispersion of particles in the solvent carrier or a homogeneous-appearing solution or mixture. More than 90 per cent recovery of materials is thereby effected. While actually the mixture at the end of the milling period contains a dispersion of phosphor particles in the binder and can be used to coat plates to provide a fluorescent layer thereon, it is apparent that additional solvent may be indicated as a means to facilitate spraying or coating of the base material.

Commercially available paint-spraying equipment can be used to spray the composition onto the bases which are customarily at room temperature, Fig. 2. It should be thoroughly cleaned prior to use to prevent the introduction of harmful impurities into the mixture. It should also provide means for heating the composition when it is not sufficiently fluid. The equipment, furthermore, should be flexible and be provided with adjusting means to enable the operator to readily produce on the base material coatings having thicknesses of from .0003 to .002 inch. Thicker coatings, of course, can be applied by longer spraying, but thicker coatings are wasteful of material and may increase the time necessary to remove the binder when making cathode ray tubes. If the coating is too thin, pinholes are apt to occur so that a continuous film is not produced. Thus, coatings as thin as .0003 inch represent about the practical limit for spraying. Other methods besides spraying can be utilized to produce thin coatings of this composition on the base plate. For example, the composition could be applied by means of a brush or a draw blade, or by dipping or roller-coating.

Moreover, it is not necessary to spray the phosphor-binder mixture, but one can first make or prepare the binder composition and spray it onto the base. While the binder is still in a tacky condition or in a semifluid state before evaporation of the solvent, the phosphor of this invention is easily dusted, sprinkled, or sprayed onto the adhesive layer to make a phosphor coating, as shown in Fig. 3.

At the end of the coating step, the base containing the phosphor composition is allowed to air-dry or it is placed in an oven and warmed in order to hasten the evaporation of the solvent.

Further, the resin and phosphor can be mixed in a dry state, chilled, pulverized, dusted or electrostatically applied to a base which is then heated to a low temperature and cooled to cause the binder to slightly flow and set, thereby providing an adherent coating.

The base or basis material or plate used in this process should be at room temperature and at least not above about 50° C., when being sprayed with the phosphor composition, in order to prevent too rapid evaporation of solvent and to prevent ripples forming in the phosphor composition film. The base material or plate can be of any desired shape. The surface of the plate should be cleaned before coating with the phosphor composition in order to remove grease and other dirt which might prevent firm adherence of the coating to the base. This can be accomplished by washing the base with any suitable alkali cleaner, or with a hydrocarbon solvent, followed by rinsing. Any gross surface irregularities should be removed by grinding or polishing, although it is not necessary to polish the base until it has mirror-like reflectivity. The base can be formed into the desired object or shape before being sprayed such as into a cathode ray or television tube, Fig. 4, or fluorescent tube, etc. Where intended for use in fluorescent or cathode ray tubes, of course, the base also should be transparent. Acceptable materials for the base have been found to be aluminum, brass, glass, aluminum-coated glass, stainless steel, nickel, steel, bronze, copper, engraver's copper, engraver's zinc, grained lithographic zinc, plastics like Lucite and cellophane, wood, leather and paper. It is obvious to those skilled in the art that other materials similar to the aforementioned can also be used as bases for the composition in order to make luminescent signs, luminescent screens, such as cathode ray screens and television tubes, luminescent designs, coatings and films and scintillation counters.

When the phosphor of the present invention is to be used in cathode ray or similar tubes, a large portion of the binder must necessarily be removed so that the light given off by the phosphor can readily be seen. This can be achieved easily by heating the phosphor coating in air at a temperature of approximately 150° C. for from 1 to 5 hours or more. The temperature must not be allowed to appreciably exceed 150° C. in order to prevent the phosphor from fusing, oxidizing, or having changes in its crystal structure so that it will not fluoresce. Thus, using low temperatures for long periods of time is required to remove the binder without oxidizing the phosphor or changing its crystal configuration due to the thin layers and large areas exposed. At the end of the heat-treatment step, the phosphor will be bound to the base by a thin layer of binder, said binder being largely discontinuous, with the phosphor particles forming a plurality of closely adjacent discrete areas thereon, Fig. 5.

The phosphor of this invention can be caused to fluoresce by means of protons, alpha particles, electrons, X-rays, gamma rays, and ultraviolet rays. See Figs. 6 and 7. The apparatus producing such radiation can be placed at any convenient distance from the surface of the phosphor as is obvious to those skilled in the art.

It, of course, is realized that the compositions of the present invention may contain incidental impurities which do not adversely affect the results. However, while it is not essential, it is naturally desirable to use substantially pure materials in order to obtain consistently good results since introduction of appreciable amounts of other impurities may adversely affect the fluorescence of the phosphor as well as its adherence to the binder, etc. It, thus, is preferred to employ the chemically pure, or "C. P." grade of chemicals, whenever possible when practicing the present invention.

The following examples will serve to illustrate the invention with more particularity to those skilled in the art:

Example I

A composition was prepared by mixing 1 gram $In_2S_3$ with 0.05 g. MgF and 0.05 g. NaCl. The mixture was then heated to 900° C. in a vacuum for 12 hours. At the end of the heat, the material was allowed to cool, pulverized to approximately 325 mesh and then dusted onto a basis plate to form a thin, even coating. The coating was then exposed to ultraviolet radiation and also electron bombardment. The spectral distribution of the phosphor emission spectrum was measured with a spectrometer. A photomultiplier attached to the spectrometer allowed determinations of the intensity of fluorescence, and a filter system was incorporated for filtering out the exciting ultraviolet and electron radiation. A standard phosphor was used for making comparisons. The coating showed a yellow fluorescence of weak intensity under both types of radiation.

Example II

In an effort to test the fluorescent effect from only one of the crystallizing or fluxing agents, a sample was prepared as described in Example I, above, except that only 0.1 g. NaCl was used with the given amount of $In_2S_3$. The resulting material was fluorescent in the yellow portion of the spectrum when excited by ultraviolet radiation and also when excited by electron bombardment. In both instances the emission was of low intensity.

Example III

Indium sulfide was also treated with only 0.1 g. of KI, as the flux material, in the same manner as described in Example I. The resulting material was not fluorescent. It, thus, would appear that KI does not act as a crystallizing or fluxing agent for the $In_2S_3$. This would explain the absence of fluorescence as would also the fact that the iodine atom is probably not soluble in the $IN_2S_3$ crystal lattice due to its larger atomic radii.

Example IV 1 g. indium sulfide was also treated with 0.1 g. NaCl and 0.0001 g. of Cu (as CuS) for 4 hours at 900° C. in a vacuum. Another run was made wherein Te (as TeS) was substituted for the copper. Each of the resulting materials as well as essentially pure $In_2S_3$ (untreated) were tested for fluorescence. None of these materials, including the $In_2S_3$ blank, were fluorescent. This would indicate that the activators are ineffective without the proper crystallizer or flux combination or that they may adversely affect the flux when one of its components is absent.

It, thus, is readily seen from the foregoing examples that, unless the combination of elements or compounds are used as taught herein, acceptable fluorescent indium sulfides are not produced. On the other hand, the following examples illustrate the results obtained using the proper materials and combinations thereof:

Example V

An indium-sulfide base phosphor was prepared by mixing 1 g. of $In_2S_3$ with 0.05 g. NaCl, 0.05 g. MgF and 0.0001 g. Ag as $AgNO_3$. The mixture was heated to 850° C. in a vacuum for 12 hours.

At the end of the heat, the material was allowed to cool, pulverized to approximately 325 mesh and then spread onto a base plate. It was then subjected to excitation by means of ultraviolet radiation from a mercury vapor lamp and exhibited fluorescence in the orange-red portion of the spectrum. It was also sensitive when tested under electron bombardment.

*Example VI*

An indium-base phosphor was prepared in the same manner as Example V except that 0.0001 g. of Cu as CuS was used in place of the Ag. The resulting material was fluorescent in the yellow to red portion of the spectrum when excited by ultraviolet radiation from a mercury vapor lamp, Fig. 8. It was also sensitive to electron bombardment.

*Example VII*

An indium-base phosphor was prepared in the same manner as shown in Example V except that 0.001 g. of Cu as CuS was used as the activator in place of the Ag and the mixture was fired in a vacuum (Vycor test tube) for three hours at 982° C. Both heating and cooling were very rapid. The use of a Vycor container made it possible to check for fluorescence without removing the material from the container. A yellow-orange fluorescence was noted under ultraviolet light.

*Example VIII*

An indium-base phosphor was prepared in the same manner as Example V except that 0.0002 g. of Cu as CuS was used in place of the Ag. The resulting material was fluorescent in the yellow portion of the spectrum when subjected to electron bombardment and X-rays.

*Example IX*

An indium-base phosphor was prepared in the same manner as disclosed in Example V except that 0.0001 g. of Mn as $MnCl_2.4H_2O$ was used in place of the Ag. The resulting phosphor was fluorescent in the orange portion of the spectrum when excited by ultraviolet radiation and also by electron bombardment.

*Example X*

Another indium-base phosphor was prepared in the same manner as disclosed in Example V except that 0.0001 g. of Sn as $SnI_4$ was substituted for the Ag. The phosphor fluoresced in the yellow portion of the spectrum when excited by ultraviolet radiation.

*Example XI*

Still another indium-base phosphor was made in the manner described in Example V except that 0.0001 g. of Li as LiBr was substituted for the Ag and that, after pulverization, one volume of the phosphor was mixed with one volume of acryloid B.72 and one volume of toluene and sprayed onto a base plate to provide a thin film. It exhibited a yellow fluorescence under ultraviolet radiation.

*Example XII*

A double-activated indium-base phosphor was prepared as shown in Example V except that 0.0001 g. of Mn as $MnCl_2.4H_2O$ and 0.0001 g. of Cu as CuS were used in place of the silver. The resulting phosphor exhibited fluorescence in the reddish-brown portions of the spectrum when subjected to electron bombardment.

Still other indium-sulfide phosphor compositions were prepared by the method set forth in Example V above. The amounts of components and the results obtained when subjected to radiation are shown in the following examples.

*Example XIII*

1 g. $In_2S_3$ plus 0.05 g. NaCl plus 0.05 g. MgF plus 0.0001 g. Cu (as CuS) and plus 0.0001 g. Ag as $AgNO_3$—yellow fluorescence (ultraviolet)—intense yellow (electron bombardment).

*Example XIV*

1 g. $In_2S_3$ plus 0.05 g. NaCl plus 0.05 g. MgF and plus 0.0001 g. Cd as $CdCl_2.2\frac{1}{2}H_2O$—orange-yellow fluorescence (ultraviolet).

*Example XV*

1 g. $In_2S_3$ plus 0.05 g. NaCl plus 0.05 g. MgF and plus 0.0001 g. Pb as PbS—yellow fluorescence (ultraviolet).

*Example XVI*

1 g. $In_2S_3$ plus 0.05 g. NaCl plus 0.05 g. MgF and plus 0.0001 g. Zn metal dust—yellow fluorescence (ultraviolet).

*Example XVII*

1 g. $In_2S_3$ plus 0.05 g. NaCl plus 0.05 g. MgF and plus 0.0001 g. cerium as $Ce_2O_3$—yellow fluorescence (electron bombardment).

*Example XVIII*

1 g. $In_2S_3$ plus 0.05 g. NaCl plus 0.05 g. MgF and plus 0.001 g. neodymium as $Nd_2O_3$—yellow fluorescence (electron bombardment).

The indium sulfide base phosphors of the present invention have very high emission in the yellow to red region of the spectrum. The width of the band obtainable is from about 4750 to about 7000 Å., where the overall visibility range can extend from 4000 to 7200 Å. These phosphors also have short persistence which together with the large amount of red-orange-yellow emission makes them ideally suitable for cathode ray screens, and, in particular, color television tubes. The yellows again emphasize the desirability of the composition for use in paints. A further point is that indium sulfide can be very readily crystallized with the proper crystal lattice, by employing only very minor amounts of a crystallizer which melts or boils below the melting (sublimation point of the indium sulfide) and in which the indium sulfide as well as the activator will readily dissolve. On cooling, the sulfide will have the proper crystal lattice with the activator in the lattice.

It is not precisely known why indium sulfide will fluoresce when treated with a metallic halide crystallizing agent and a metal-base activator, but it is believed that this fluorescence may be explained by the fact that the ability of the metallic halide crystallizing agent to form the proper lattices or centers is probably due to the solubility of these compounds in the indium sulfide lattice or vice versa and to the ability of the indium sulfide to form a spinel-type crystal structure in presence of the crystallizer. Since indium sulfide is a crystal with a largely covalent type of bonding, this solubility of the flux is dependent not only upon the ionic radii, but also on the capacity of the ions to form covalent bonds. Chlorides and bromides have intermediate properties in both respects and are, therefore, especially suitable in forming fluorescent centers. Iodides have a stronger tendency toward covalency, but owing to the larger radius of iodine, this advantage is lost and only a very little, if any, is dissolved. The fluorides have a stronger tendency toward ionic bonding and are, therefore, probably also less soluble.

The mechanism for fluorescence is believed to be due to an electron transition from the activator atom to the conduction band in either a one- or two-step process. In a one-step process, it goes directly into the conduction band; in a two-step process, it is excited to a metastable energy level or trap below the conduction band from which it is excited to the conduction band by thermal energies. On returning from the conduction band, it will fall to an excited state of the activator atom and the transition from the excited state to the ground state of the activator atom results in photon emission. Thus, the fundamental absorption of indium sulfide corresponds to an electronic transition from the upper occupied S minus 2 band to the lower unoccupied In plus 3 band and the fundamental fluorescence corresponds to the reverse process. This is the situation for indium sulfide activated with copper sulfide. The yellow fluorescence caused by levels introduced by the activator material is due to a transition between the conduction band and these levels. A band structure diagram of this process has been shown in Fig. 9. The fundamental fluorescence disappears in indium sulfide when the yellow centers are present. This is due to the fact that when yellow centers are present, holes may be trapped in the levels of the yellow centers and recombination of free electrons with these holes give rise to the yellow fluorescence. A fraction of the recombinations may still give rise to the fundamental fluorescence, but the wavelength region of the fundamental fluorescence band coincides with that covered by the absorption band of the yellow centers so that it will be reabsorbed in the yellow centers and will thereby give rise to yellow fluorescence. It also will be noted that a number of different activator materials have been found to give a different colored fluorescence. This could be due to the wavelength of the fluorescence of the activator overlapping the absorption range of the yellow centers and being reabsorbed giving rise to the different colored fluorescence. Thus, it is expected that the mechanism for luminescence in various indium-sulfide phosphors is similar, but the energy separation will be different so the color of the center will be different.

In summary, it is seen that this invention teaches that a new and novel phosphor compound can be readily obtained by treating indium sulfide with a metallic halide crystallizing agent and a metallic-base activator at a temperature and for a period of time sufficient to cause the indium sulfide to form a crystal lattice of a spinel type in which a minor amount of a metallic base activator with a minor amount of the crystallizer is absorbed to provide fluorescent centers. A wide emission band providing colors from yellow to red can be obtained by varying the kind of metal activator used, making the phosphor of the present invention especially suitable for use in colored television processes. They can also be excited by many types of radiation such as ultraviolet, X-ray, protons, alpha particles, etc. Finally, this new and novel indium-sulfide base phosphor can readily be incorporated in a binder and easily sprayed on to various articles to provide coatings which will fluoresce under the proper radiation conditions. Among articles which can be easily made with the phosphor compound of this invention are cathode ray tubes, scintillation counters, fluorescent screens, etc. It, thus, is seen that a new and novel phosphor has been invented which materially advances the art.

This application is a copending application of Reynolds, Middleton and Peet, entitled "Composition Containing Indium," Serial No. 242,563, filed August 18, 1951.

Having thus described the invention, what is claimed as new and novel and what is desired to be secured by Letters Patent is:

1. A phopshor composition consisting essentially of a predominant amount of crystallized indium sulfide in spinel form and a minor amount, from about 0.01% to about 10%, of a metal base crystallizing agent selected from the group consisting of magnesium chloride, magnesium chloride and sodium chloride, magnesium chloride and sodium bromide, magnesium fluoride and sodium chloride, magnesium fluoride and sodium bromide, magnesium chloride and potassium bromide, magnesium chloride and potassium chloride, magnesium fluoride and potassium bromide, and magnesium fluoride and potassium chloride, sufficient to form a crystal lattice in said sulfide for the absorption of an activator selected from the group consisting of cadmium, cooper, gold, lead, lithium, manganese, silver, tin, zinc, and the rare earth metals, and their halide, nitrate, nitride, oxide, sulfate, and sulfide salts, and of a metal base activator, from about 0.001% to about 0.1%, sufficient to provide primary fluorescent centers in said crystal, said activator having been absorbed in said crystal lattice.

2. A phosphor composition in crystalline spinel form comprising a metallic base activator selected from the group consisting of cadmium, copper, gold, lead, lithium, manganese, silver, tin, zinc, and the rare earth metals, their halide, nitrate, nitride, oxide, sulfate, and sulfide salts, and mixtures thereof, in an amount of from 0.001 to 0.1% by weight based on the metal, from 0.01 to 10% by weight of a metallic base crystallizing agent selected from the group consisting of magnesium chloride, magnesium chloride and sodium chloride, magnesium chloride and sodium bromide, magnesium fluoride and sodium chloride, magnesium fluoride and sodium bromide, magnesium chloride and potassium bromide, magnesium chloride and potassium chloride, magnesium fluoride and potassium bromide, and magnesium fluoride and potassium chloride, and the balance essentially indium sulfide.

3. A heat reacted and crystallized phosphor in spinel form consisting of 4.5% by weight of sodium chloride and 4.5% by weight of magnesium fluoride as the crystallizing agent, 0.009% by weight of silver as $AgNO_3$ as the activator and the balance indium sulfide.

4. A heat reacted and crystallized phosphor in spinel form consisting of 4.5% by weight of sodium chloride and 4.5% by weight of magnesium fluoride as the crystallizing agent, 0.009% by weight of copper as CuS as the activator and the balance indium sulfide.

5. A heat reacted and crystallized phosphor in spinel form consisting of 4.5% by weight of sodium chloride and 4.5% by weight of magnesium fluoride as the crystallizing agent, 0.009% by weight of manganese as $Mn \cdot Cl_2 \cdot 4H_2O$ and 0.009% copper as CuS as the activator and balance indium sulfide.

6. A heat reacted and crystallized phosphor in

17 spinel form consisting of 4.5% by weight of sodium chloride and 4.5% by weight of magnesium chloride as the crystallizing agent, 0.009% by weight of tin as SnI4 as the activator and the balance indium sulfide.

7. A heat reacted and crystallized phosphor in spinel form consisting of 4.5% by weight of sodium chloride and 4.5% by weight of magnesium chloride as the crystallizing agent, 0.009% by weight of zinc as the activator and the balance indium sulfide.

8. A composition of matter according to claim 1 containing additionally a sufficient amount of a binder solution to enable said composition to be sprayed onto a base to form an adherent coating thereon.

9. A phosphor composition according to claim 2 containing additionally from 0.1 to 15 volumes of an organic binder and from 0.05 to 75 volumes of organic solvent to 1 volume of said phosphor.

10. A phosphor composition according to claim 2 containing additionally from 0.2 to 0.5 volume of an organic binder and from 0.16 to 0.7 volume of organic solvent to 1 volume of said phosphor.

11. In the method of producing phosphor materials, the steps comprising treating a major amount of indium sulfide, capable of being activated and emitting fluorescence under radiation after being treated, with a minor amount of a metal base crystallizing agent, from about 0.01% to about 10%, selected from the group consisting of magnesium chloride, magnesium chloride and sodium chloride, magnesium chloride and sodium bromide, magnesium fluoride and sodium chloride, magnesium fluoride and sodium bromide, magnesium chloride and potassium bromide, magnesium chloride and potassium chloride, magnesium fluoride and potassium bromide, and magnesium fluoride and potassium chloride, sufficient to form a crystal lattice in said sulfide for the absorption of an activator and a minor amount of a metallic base activator, from about 0.001% to about 0.1%, selected from the group consisting of cadmium, copper, gold, lead, lithium, manganese, silver, tin, zinc, and the rare earth metals, and their halide, nitrate, nitride, oxide, sulfate, and sulfide salts, in a vacuum at a temperature and for a period of time sufficient to cause said crystallizing agent to melt and dissolve said indium sulfide and activator and cooling said melt to form an indium sulfide spinel type crystal having fluorescent centers in its lattice.

12. In the method of producing indium sulfide phosphors, the steps comprising heating a mixture consisting essentially of a metallic base activator selected from the group consisting of cadmium, copper, gold, lead, lithium, manganese, silver, tin, zinc, and the rare earth metals, their halide, nitrate, nitride, oxide, sulfate, and sulfide salts, and mixtures thereof, in an amount of from 0.001 to 0.1 per cent by weight based on the metal, from 0.01 to 10% by weight of a metallic base crystallizing agent selected from the group consisting of magnesium chloride, magnesium chloride and sodium chloride, magnesium chloride and sodium bromide, magnesium fluoride and sodium chloride, magnesium fluoride and sodium bromide, magnesium chloride and potassium bromide, magnesium chloride and potassium chloride, magnesium fluoride and potassium bromide, and magnesium fluoride and potassium chloride, and the balance indium sulfide in a vacuum at a temperature of from 800 to 1000° C. for from 4 to 12 hours to form a melt and then cooling said melt to cause said sulfide to crystallize therefrom in spinel form by means of said crystallizer and said activator to enter the lattice thereof to form primary fluorescent centers.

18

13. In the method of producing phosphor materials, according to claim 11, the additional steps including pulverizing and dispersing the resulting phosphor in an organic binder-solvent composition and spraying it onto a base material.

14. In the method of producing phosphor materials, according to claim 11, the additional steps of pulverizing said phosphor and then applying it in finely-divided form to a surface having a coating of a binder-solvent composition thereon.

15. In the method of producing phosphor materials, according to claim 11, the additional steps of pulverizing and dispersing the resulting phosphor in an organic binder solution, spraying the resulting composition onto a base plate, allowing said coated plate to dry, and finally treating said plate with heated air to remove substantially all of said binder leaving said phosphor as a plurality of discrete particles secured to said base by the remaining, discontinuous film of said binder.

16. In the method of producing phosphor materials according to claim 11, the additional steps of pulverizing and mixing the resulting phosphor with an organic binder, reducing the resulting mixture to a finely divided state, dusting said finely divided mixture on a basis material, and finally heating and cooling said dusted mixture to cause it to flow and adhere to said basis material thereby providing a phosphor coating.

17. An article of manufacture comprising a base and a fluorescent coating thereon, said coating comprising a phosphor in spinel form consisting essentially of a major amount of indium sulfide and a minor amount of a metallic-base activator, from about 0.001% to about 0.1%, selected from the group consisting of cadmium, copper, gold, lead, lithium, manganese, silver, tin, zinc, and the rare earth metals, and their halide, nitrate, nitride, oxide, sulfate, and sulfide salts, sufficient to cause fluorescence of said sulfide under radiation and of a metallic-base crystallizing agent, from about 0.10% to about 10%, selected from the group consisting of magnesium chloride, magnesium chloride and sodium chloride, magnesium chloride and sodium bromide, magnesium fluoride and sodium chloride, magnesium fluoride and sodium bromide, magnesium chloride and potassium bromide, magnesium chloride and potassium chloride, magnesium fluoride and potassium bromide, and magnesium fluoride and potassium chloride, sufficient to form a lattice in said sulfide for the absorption of said activator, said coating constituting a plurality of discrete particles of said phosphor secured to said base by a discontinuous layer of an organic binder.

References Cited in the file of this patent

UNITED STATES PATENTS

| Number | Name | Date |
|---|---|---|
| 2,344,081 | Claude | Mar. 14, 1944 |

OTHER REFERENCES

"Rarer Metals," De Ment & Dake Chemical Pub. Co., 1946, page 34.